US012718777B2

(12) United States Patent
Deliwala et al.

(10) Patent No.: US 12,718,777 B2
(45) Date of Patent: Aug. 25, 2026

(54) METHOD OF DRIVING A COLOR ELECTOPHORETIC DISPLAY TO FORM IMAGES WITHOUT DITHERING

(71) Applicant: E INK CORPORATION, Billerica, MA (US)

(72) Inventors: Amit Deliwala, Andover, MA (US); Stephen J. Telfer, Arlington, MA (US); Neil Sunil Patel, Arlington, MA (US); Ian Hunter, Waltham, MA (US)

(73) Assignee: E Ink Corporation, Billerica, MA (US)

( * ) Notice: Subject to any disclaimer, the term of this patent is extended or adjusted under 35 U.S.C. 154(b) by 18 days.

(21) Appl. No.: 18/964,409

(22) Filed: Nov. 30, 2024

(65) Prior Publication Data

US 2025/0191547 A1 Jun. 12, 2025

Related U.S. Application Data

(60) Provisional application No. 63/606,595, filed on Dec. 6, 2023.

(51) Int. Cl.
*G09G 3/34* (2006.01)

(52) U.S. Cl.
CPC ......... *G09G 3/344* (2013.01); *G09G 2310/06* (2013.01); *G09G 2320/0242* (2013.01); *G09G 2320/0257* (2013.01)

(58) Field of Classification Search
CPC ............... G09G 3/344; G09G 2310/06; G09G 2320/0242; G09G 2320/0257; G09G 2320/0666; G09G 3/2003; G09G 2230/00
See application file for complete search history.

(56) References Cited

U.S. PATENT DOCUMENTS 4,418,346 A 11/1983 Batchelder
5,760,761 A 6/1998 Sheridon
(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.
(Continued)

*Primary Examiner* — Benjamin C Lee
*Assistant Examiner* — Emily J Frank
(74) *Attorney, Agent, or Firm* — Brian D. Bean

(57) ABSTRACT

A method for creating waveforms having a multi-transition structure for driving color electrophoretic displays is described. The method includes generating a set of seed candidate waveforms, and applying each seed candidate waveform to the display pixels of the color electrophoretic display. The method includes measuring the optical state of each color created at the display pixels by applying the seed candidate waveforms, and selecting a set of seed waveforms based on the optical measurements of the colors produced by applying each seed candidate waveform. The method also includes generating a first sequence of perturbation waveforms, and applying each perturbation waveform of the first sequence of perturbation waveforms to each seed waveform of the color electrophoretic display. The method also includes measuring the optical state of each color created at the display pixels by applying each perturbation waveform of the first sequence to each seed waveform.

16 Claims, 13 Drawing Sheets
(7 of 13 Drawing Sheet(s) Filed in Color)

(56) References Cited

U.S. PATENT DOCUMENTS 5,777,782 A 7/1998 Sheridon
5,808,783 A 9/1998 Crowley
5,872,552 A 2/1999 Gordon, II et al.
5,930,026 A 7/1999 Jacobson et al.
6,054,071 A 4/2000 Mikkelsen, Jr.
6,055,091 A 4/2000 Sheridon et al.
6,097,531 A 8/2000 Sheridon
6,128,124 A 10/2000 Silverman
6,130,774 A 10/2000 Albert et al.
6,137,467 A 10/2000 Sheridon et al.
6,144,361 A 11/2000 Gordon, II et al.
6,147,791 A 11/2000 Sheridon
6,172,798 B1 1/2001 Albert et al.
6,184,856 B1 2/2001 Gordon, II et al.
6,225,971 B1 5/2001 Gordon, II et al.
6,241,921 B1 6/2001 Jacobson et al.
6,271,823 B1 8/2001 Gordon, II et al.
6,301,038 B1 10/2001 Fitzmaurice et al.
6,445,489 B1 9/2002 Jacobson et al.
6,504,524 B1 1/2003 Gates et al.
6,512,354 B2 1/2003 Jacobson et al.
6,531,997 B1 3/2003 Gates et al.
6,672,921 B1 1/2004 Liang et al.
6,753,999 B2 6/2004 Zehner et al.
6,788,449 B2 9/2004 Liang et al.
6,825,970 B2 11/2004 Goenaga et al.
6,866,760 B2 3/2005 Paolini, Jr. et al.
6,870,657 B1 3/2005 Fitzmaurice et al.
6,900,851 B2 5/2005 Morrison et al.
6,922,276 B2 7/2005 Zhang et al.
6,950,220 B2 9/2005 Abramson et al.
6,982,178 B2 1/2006 LeCain et al.
6,995,550 B2 2/2006 Jacobson et al.
7,002,728 B2 2/2006 Pullen et al.
7,012,600 B2 3/2006 Zehner et al.
7,023,420 B2 4/2006 Comiskey et al.
7,034,783 B2 4/2006 Gates et al.
7,061,166 B2 6/2006 Kuniyasu
7,061,662 B2 6/2006 Chung et al.
7,072,095 B2 7/2006 Liang et al.
7,075,502 B1 7/2006 Drzaic et al.
7,116,318 B2 10/2006 Amundson et al.
7,116,466 B2 10/2006 Whitesides et al.
7,119,772 B2 10/2006 Amundson et al.
7,144,942 B2 12/2006 Zang et al.
7,170,670 B2 1/2007 Webber
7,177,066 B2 2/2007 Chung et al.
7,193,625 B2 3/2007 Danner et al.
7,202,847 B2 4/2007 Gates
7,236,291 B2 6/2007 Kaga et al.
7,242,514 B2 7/2007 Chung et al.
7,259,744 B2 8/2007 Arango et al.
7,304,787 B2 12/2007 Whitesides et al.
7,312,784 B2 12/2007 Baucom et al.
7,312,794 B2 12/2007 Zehner et al.
7,321,459 B2 1/2008 Masuda et al.
7,327,511 B2 2/2008 Whitesides et al.
7,408,699 B2 8/2008 Wang et al.
7,411,719 B2 8/2008 Paolini, Jr. et al.
7,420,549 B2 9/2008 Jacobson et al.
7,453,445 B2 11/2008 Amundson
7,492,339 B2 2/2009 Amundson
7,528,822 B2 5/2009 Amundson et al.
7,535,624 B2 5/2009 Amundson et al.
7,545,358 B2 6/2009 Gates et al.
7,583,251 B2 9/2009 Arango et al.
7,602,374 B2 10/2009 Zehner et al.
7,612,760 B2 11/2009 Kawai
7,679,599 B2 3/2010 Kawai
7,679,813 B2 3/2010 Liang et al.
7,679,814 B2 3/2010 Paolini, Jr. et al.
7,683,606 B2 3/2010 Kang et al.
7,688,297 B2 3/2010 Zehner et al.
7,715,088 B2 5/2010 Liang et al.
7,729,039 B2 6/2010 LeCain et al.
7,733,311 B2 6/2010 Amundson et al.
7,733,335 B2 6/2010 Zehner et al.
7,787,169 B2 8/2010 Abramson et al.
7,839,564 B2 11/2010 Whitesides et al.
7,859,742 B1 12/2010 Chiu et al.
7,952,557 B2 5/2011 Amundson
7,956,841 B2 6/2011 Albert et al.
7,982,479 B2 7/2011 Wang et al.
7,999,787 B2 8/2011 Amundson et al.
8,009,348 B2 8/2011 Zehner et al.
8,077,141 B2 12/2011 Duthaler et al.
8,125,501 B2 2/2012 Amundson et al.
8,139,050 B2 3/2012 Jacobson et al.
8,174,490 B2 5/2012 Whitesides et al.
8,243,013 B1 8/2012 Sprague et al.
8,274,472 B1 9/2012 Wang et al.
8,289,250 B2 10/2012 Zehner et al.
8,300,006 B2 10/2012 Zhou et al.
8,305,341 B2 11/2012 Arango et al.
8,314,784 B2 11/2012 Ohkami et al.
8,373,649 B2 2/2013 Low et al.
8,384,658 B2 2/2013 Albert et al.
8,456,414 B2 6/2013 Lin et al.
8,462,102 B2 6/2013 Wong et al.
8,514,168 B2 8/2013 Chung et al.
8,537,105 B2 9/2013 Chiu et al.
8,558,783 B2 10/2013 Wilcox et al.
8,558,785 B2 10/2013 Zehner et al.
8,558,786 B2 10/2013 Lin
8,558,855 B2 10/2013 Sprague et al.
8,576,164 B2 11/2013 Sprague et al.
8,576,259 B2 11/2013 Lin et al.
8,593,396 B2 11/2013 Amundson et al.
8,605,032 B2 12/2013 Liu et al.
8,643,595 B2 2/2014 Chung et al.
8,665,206 B2 3/2014 Lin et al.
8,681,191 B2 3/2014 Yang et al.
8,730,153 B2 5/2014 Sprague et al.
8,810,525 B2 8/2014 Sprague
8,928,562 B2 1/2015 Gates et al.
8,928,641 B2 1/2015 Chiu et al.
8,976,444 B2 3/2015 Zhang et al.
9,013,394 B2 4/2015 Lin
9,019,197 B2 4/2015 Lin
9,019,198 B2 4/2015 Lin et al.
9,019,318 B2 4/2015 Sprague et al.
9,082,352 B2 7/2015 Cheng et al.
9,171,508 B2 10/2015 Sprague et al.
9,218,773 B2 12/2015 Sun et al.
9,224,338 B2 12/2015 Chan et al.
9,224,342 B2 12/2015 Lin et al.
9,224,344 B2 12/2015 Chung et al.
9,230,492 B2 1/2016 Harrington et al.
9,251,736 B2 2/2016 Lin et al.
9,262,973 B2 2/2016 Wu et al.
9,269,311 B2 2/2016 Amundson
9,279,906 B2 3/2016 Kang
9,299,294 B2 3/2016 Lin et al.
9,373,289 B2 6/2016 Sprague et al.
9,390,066 B2 7/2016 Smith et al.
9,390,661 B2 7/2016 Chiu et al.
9,412,314 B2 8/2016 Amundson et al.
9,460,666 B2 10/2016 Sprague et al.
9,495,918 B2 11/2016 Harrington et al.
9,501,981 B2 11/2016 Lin et al.
9,513,743 B2 12/2016 Sjodin et al.
9,514,667 B2 12/2016 Lin
9,542,895 B2 1/2017 Gates et al.
9,564,088 B2 2/2017 Wilcox et al.
9,612,502 B2 4/2017 Danner et al.
9,620,048 B2 4/2017 Sim et al.
9,620,067 B2 4/2017 Harrington et al.
9,672,766 B2 6/2017 Sjodin
9,691,333 B2 6/2017 Cheng et al.
9,721,495 B2 8/2017 Harrington et al.
9,792,861 B2 10/2017 Chang et al.
9,792,862 B2 10/2017 Hung et al.
9,966,018 B2 5/2018 Gates et al.
10,163,406 B2 12/2018 Sim et al.

(56) References Cited

U.S. PATENT DOCUMENTS

| | | | |
|---|---|---|---|
| 10,229,641 B2 | 3/2019 | Yang et al. | |
| 10,319,313 B2 | 6/2019 | Harris et al. | |
| 10,339,876 B2 | 7/2019 | Lin et al. | |
| 10,444,553 B2 | 10/2019 | Laxton | |
| 10,672,350 B2 | 6/2020 | Amundson et al. | |
| 11,049,463 B2 | 6/2021 | Lin et al. | |
| 11,450,262 B2 | 9/2022 | Ben-Dov et al. | |
| 11,520,202 B2 | 12/2022 | Paydavosi et al. | |
| 11,557,260 B2 | 1/2023 | Crounse et al. | |
| 2003/0102858 A1 | 6/2003 | Jacobson et al. | |
| 2004/0246562 A1 | 12/2004 | Chung et al. | |
| 2005/0253777 A1 | 11/2005 | Zehner et al. | |
| 2007/0091418 A1 | 4/2007 | Danner et al. | |
| 2007/0103427 A1 | 5/2007 | Zhou et al. | |
| 2007/0176912 A1 | 8/2007 | Beames et al. | |
| 2008/0024429 A1 | 1/2008 | Zehner | |
| 2008/0024482 A1 | 1/2008 | Gates et al. | |
| 2008/0136774 A1 | 6/2008 | Harris et al. | |
| 2008/0303780 A1 | 12/2008 | Sprague et al. | |
| 2009/0174651 A1 | 7/2009 | Jacobson et al. | |
| 2009/0322721 A1 | 12/2009 | Zehner et al. | |
| 2010/0194733 A1 | 8/2010 | Lin et al. | |
| 2010/0194789 A1 | 8/2010 | Lin et al. | |
| 2010/0220121 A1 | 9/2010 | Zehner et al. | |
| 2010/0265561 A1 | 10/2010 | Gates et al. | |
| 2011/0063314 A1 | 3/2011 | Chiu et al. | |
| 2011/0193840 A1 | 8/2011 | Amundson et al. | |
| 2011/0193841 A1 | 8/2011 | Amundson et al. | |
| 2011/0199671 A1 | 8/2011 | Amundson et al. | |
| 2011/0221740 A1 | 9/2011 | Yang et al. | |
| 2012/0001957 A1 | 1/2012 | Liu et al. | |
| 2012/0001958 A1* | 1/2012 | Liu | G09G 3/344 345/107 |
| 2012/0098740 A1 | 4/2012 | Chiu et al. | |
| 2013/0063333 A1 | 3/2013 | Arango et al. | |
| 2013/0249782 A1 | 9/2013 | Wu et al. | |
| 2014/0009817 A1 | 1/2014 | Wilcox et al. | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2015/0005720 A1 | 1/2015 | Zang | |
| 2015/0262255 A1 | 9/2015 | Khajehnouri et al. | |
| 2016/0012710 A1 | 1/2016 | Lu et al. | |
| 2016/0140910 A1 | 5/2016 | Amundson | |
| 2016/0180777 A1 | 6/2016 | Lin et al. | |
| 2016/0335958 A1* | 11/2016 | Huang | G02F 1/133621 |
| 2021/0081894 A1* | 3/2021 | Alesiani | G06Q 10/08355 |
| 2021/0398462 A1* | 12/2021 | Jang | G09G 3/006 |
| 2022/0084473 A1* | 3/2022 | Telfer | G02F 1/167 |
| 2022/0319446 A1* | 10/2022 | Ma | G09G 3/344 |
| 2023/0282462 A1* | 9/2023 | Samuels | H01J 37/32926 700/160 |

OTHER PUBLICATIONS

Wood, D., “An Electrochromic Renaissance?” Information Display, 18(3), 24 (Mar. 2002). Mar. 1, 2002.

Bach, Udo. et al., “Nanomaterials-Based Electrochromics for Paper-Quality Displays”, Adv. Mater, vol. 14, No. 11, pp. 845-848, (Jun. 5, 2002). Jun. 5, 2002.

Hayes, R.A. et al., “Video-Speed Electronic Paper Based on Electrowetting”, Nature, vol. 425, No. 25, pp. 383-385 (Sep. 2003). Sep. 25, 2003.

Kitamura, T. et al., “Electrical toner movement for electronic paper-like display”, Asia Display/IDW ’01, pp. 1517-1520, Paper HCS1-1 (2001). 2001.

Yamaguchi, Y. et al., “Toner display using insulative particles charged triboelectrically”, Asia Display/IDW ’01, pp. 1729-1730, Paper AMD4-4 (2001). 2001.

Hertel, Dirk, “Optical measurement standards for reflective e-paper to predict colors displayed in ambient illumination environments,” Color Res Appl, 2018; 1-15. 2018.

European Patent Office, “International Search Report and Written Opinion”, PCT/US2024/058843, Mar. 7, 2025.

* cited by examiner

200

100

1300b

1300a

1300d

1300c

METHOD OF DRIVING A COLOR ELECTOPHORETIC DISPLAY TO FORM IMAGES WITHOUT DITHERING

CROSS-REFERENCE TO RELATED APPLICATIONS

This application claims priority to U.S. Provisional Application No. 63/606,595, filed on Dec. 6, 2023, the entire contents of which are incorporated herein by reference. Further, the entire contents of any patent, published application, or other published work referenced herein are incorporated by reference in their entireties.

FIELD OF THE INVENTION

This invention relates to invention relates to methods for driving electro-optic displays. More specifically, this invention relates to driving methods for rendering images on color electrophoretic displays.

BACKGROUND OF THE INVENTION

Half-toning has been used for many decades in the printing industry to represent gray tones by covering a varying proportion of each pixel of white paper with black ink. (The term "pixel" is used herein in its conventional meaning in the display art to mean the smallest unit of a display capable of generating all the colors which the display itself can show.) Similar half-toning schemes can be used with CMY or CMYK color printing systems, with the color channels being varied independently of each other.

However, there are many color systems in which the color channels cannot be varied independently of one another, in as much as each pixel can only display any one of a limited set of primary colors (such systems may hereinafter be referred to as "limited palette displays" or "PLDs"). Electrochromic displays are one example of this type of display.

In order to create colors other than the primaries, conventional limited palette displays typically use spatial dithering of the primaries to produce the correct color sensation. Conventional methods for displaying full-color images on a color electrophoretic display involve use of spatial dithering in which a fixed set of palette colors are mixed to from colors within the gamut volume of space spanned by the palette colors. For example, spatial dithering can be accomplished by positioning adjacent pixels of differing colors that are within the display's color palette in a pattern such that they have the appearance of a desired color when viewed from a distance. The average of the color values (e.g., RGB values) of the pixels used in a dithering pattern typically must be close to the value of the desired color.

One reason spatial dithering has traditionally been used is because waveform tuning is typically a challenging endeavor, and waveforms generated for transitioning the optical state of electrophoretic displays typically involve dependence on the prior optical state. As one example, for an electrophoretic display having a set of N palette colors, $N^2$ waveforms must be generated for each driving mode in order to be capable of transitioning from every prior optical state to every possible desired target optical state. Each palette color typically has a color target and a specific optimization procedure is used to find the transition that achieves that target color from different prior optical states. Accordingly, as the number of palette colors increases, the number of transitions increases exponentially and can become difficult to manage. Further, conventional controller solutions typically restrict the number of states that can be defined.

However, while spatial dithering can be an effective technique to enable a display to present colors outside of its color gamut, there are some considerations when using spatial dithering on electrophoretic displays. For example, many electrophoretic displays typically include an active matrix backplane, a master controller, local memory and a set of communication and interface ports. The master controller receives data including image data via the communication/interface ports or retrieves it from the device memory. Once the data is in the master controller, it is translated into a set of instruction for the active matrix backplane. The active matrix backplane receives these instructions from the master controller and applies waveforms to the pixels accordingly to produce an image. In the case of a color electrophoretic display device, the on-device gamut computations necessary to implement spatial dithering can be intensive and may require a master controller with increased computational power.

The increased computational power required for image rendering diminishes the advantages of electrophoretic displays in some applications. In particular, the cost of manufacturing the device increases, as does the device power consumption, for instance, when the master controller is configured to perform complicated rendering algorithms. Furthermore, the extra heat generated by the controller requires thermal management.

A second consideration is that depending on the viewing distance of the observer from the electrophoretic displays, spatial dithering is not visible and is therefore ineffective for its intended purpose of simulating a color that is missing from the electrophoretic display's color palette.

SUMMARY OF THE INVENTION

From the foregoing, it can be appreciated that there is a need for drive schemes capable of creating colors at each pixel that map to the color of the corresponding pixel in the original image without the use of dithering. The invention described herein overcomes the shortcomings of the prior art by providing methods for creating waveforms structured such that they are not prior state dependent. This means that the waveform applied for transitioning a pixel to a target optical state (e.g., color) does not depend on the current optical state of the pixel. Further, the invention includes a novel method for storing the structures used for assembling the waveforms that better allows for the color properties from a source image to be preserved when presented on an electrophoretic display.

Accordingly, in one aspect, the subject matter disclosed herein includes a method for creating waveforms having a multi-transition structure for driving color electrophoretic displays. The method includes generating a set of seed candidate waveforms, and applying each seed candidate waveform to the display pixels of the color electrophoretic display. The method also includes measuring the optical state of each color created at the display pixels by applying the seed candidate waveforms, and selecting a set of seed waveforms based on the optical measurements of the colors produced by applying each seed candidate waveform. The method also includes generating a first sequence of perturbation waveforms, and applying each perturbation waveform of the first sequence of perturbation waveforms to each seed waveform of the color electrophoretic display. The method also includes measuring the optical state of each color created at the display pixels by applying each perturbation waveform of the first sequence to each seed waveform.

In some embodiments, the method includes generating a second set of perturbation waveforms, applying each perturbation waveform of the second sequence to each perturbation waveform of the first sequence as applied to each seed waveform, and measuring the optical state of each color created by applying each perturbation waveform of the second sequence to each perturbation waveform of the first sequence as applied to each seed waveform.

In some embodiments, the set of seed waveforms comprises eight unique waveforms. In some embodiments, each of the eight unique waveforms corresponds to a primary color the color electrophoretic display is capable of presenting.

In some embodiments, a number of perturbation waveforms in the first sequence of perturbation waveforms corresponds to a number of voltage levels a display controller is capable of providing to each display pixel. In some embodiments, a number of perturbation waveforms in the first sequence of perturbation waveforms corresponds to a number of voltage levels a display controller is capable of providing and a duration of each perturbation waveform. In some embodiments, the number of perturbation waveforms in the first sequence of perturbation waveforms is equal to $V^M$, where V is the number of voltage levels the display controller is capable of providing and M is the duration of each perturbation waveform in number of frames. In some embodiments, a total possible number of unique waveforms that can be applied to the display pixels of the color electrophoretic display is equal to $N*V^M$, where N is the number of seed waveforms.

In some embodiments, a number of perturbation waveforms in the second sequence of perturbation waveforms corresponds to a number of voltage levels a display controller is capable of providing to each display pixel and a duration of each perturbation waveform. In some embodiments, the number of perturbation waveforms in the second sequence of perturbation waveforms is equal to $V^M$, where V is the number of voltage levels the display controller is capable of providing to each display pixel and M is the duration of each perturbation waveform in number of frames.

In some embodiments, applying each perturbation waveform of the first sequence of perturbation waveforms to each seed waveform of the color electrophoretic display comprises appending each perturbation waveform of the first sequence of perturbation waveforms to each seed waveform of the color electrophoretic display.

In some embodiments, applying each perturbation waveform of the second sequence to each perturbation waveform of the first sequence as applied to each seed waveform comprises appending each perturbation waveform of the second sequence of perturbation waveforms to each perturbation waveform of the first sequence as applied to each seed waveform.

In another aspect, the subject matter disclosed herein includes a method for driving a color electrophoretic display to form images without dithering. The method includes receiving a source image comprising a plurality of source colors, and mapping the plurality of source colors to device colors. The method also includes determining, for each device color, a seed waveform and at least one perturbation waveform for updating an optical state of a display pixel of the color electrophoretic display to each device color, and transitioning the optical state of the display pixel using the seed waveform and the at least one perturbation waveform.

In some embodiments of the method, determining includes identifying a seed index in a seed lookup table that corresponds to the seed waveform, and identifying at least one perturbation index in at least one perturbation lookup table that corresponds to the at least one perturbation waveform.

In some embodiments, a number of perturbation waveforms corresponds to a number of voltage levels a display controller is capable of providing to each display pixel. In some embodiments, a number of perturbation waveforms corresponds to a number of voltage levels a display controller is capable of providing and a duration of each perturbation waveform. In some embodiments, the number of perturbation waveforms is equal to $V^M$, where V is the number of voltage levels the display controller is capable of providing and M is the duration of each perturbation waveform in number of frames. In some embodiments, a total possible number of unique waveforms that can be applied to the display pixels of the color electrophoretic display is equal to $N*V^M$, where N is the number of seed waveforms.

In some embodiments, a KDTree algorithm is used to index unique color values that can be displayed on the color electrophoretic display based on each seed waveform in the seed lookup table and each perturbation waveform in the perturbation lookup table.

In some embodiments, mapping the plurality of source colors to device colors includes approximating a gamut volume in a device space by using the convex hull of the seed waveforms.

BRIEF DESCRIPTION OF DRAWINGS

The patent or application file contains at least one drawing executed in color. Copies of this patent or patent application publication with color drawing(s) will be provided by the Office upon request and payment of the necessary fee.

Additional details of one or more embodiments of the subject matter described in this specification are set forth in the accompanying drawings and the description below. Other features, aspects, and advantages of the subject matter will become apparent from the descriptions contained herein and the accompanying drawings. The drawings are not necessarily to scale and elements of similar structures are generally annotated with like reference numerals for illustrative purposes throughout the drawings. However, the specific properties and functions of elements in different embodiments may not be identical. Further, the drawings are only intended to facilitate the description of the subject matter. The drawings do not illustrate every aspect of the described embodiments and do not limit the scope of the present disclosure or claims.

DETAILED DESCRIPTION OF THE INVENTION

Figure 2:
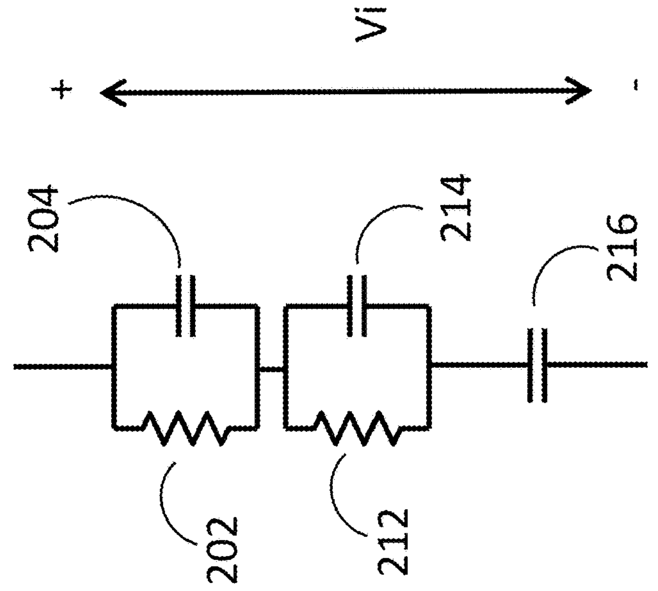
FIG. 2 illustrates an equivalent circuit of the electrophoretic display presented in FIG. 1 in accordance with the subject matter disclosed herein.

In the following detailed description, numerous specific details are set forth by way of examples in order to provide a thorough understanding of the relevant teachings. However, it should be apparent to those skilled in the art that the present teachings may be practiced without such details.

The inventive methods described here provide a drive scheme that allows for displaying full color images on a color electrophoretic display without the use of dithering of a small set of palette colors N (e.g., $N \leq 32$). The method includes a novel waveform tuning technique and multi-transition structure that is fully compatible with existing commercial electrophoretic display controllers.

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, U.S. Pat. No. 7,012,600, which is incorporated herein in its entirety, teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(c) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564.
(h) Applications of displays; see for example U.S. Pat. Nos. 7,312,784; 8,009,348;
(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and
(j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558, 786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; 9,412,314; and 9,672,766; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; 2016/0180777; and 2021/0389637.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

An Exemplary EPD

Figure 1:
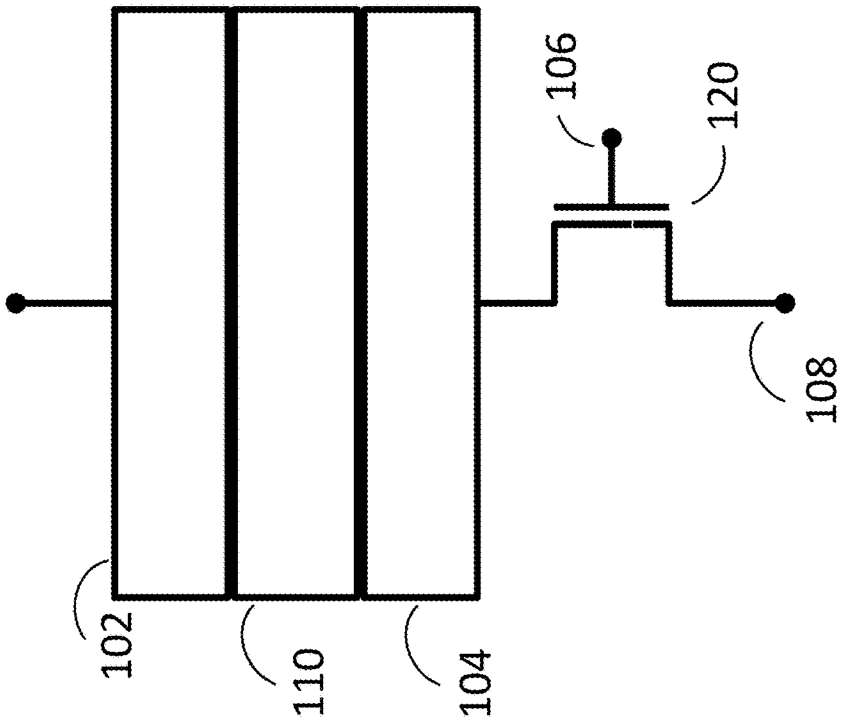
FIG. 1 illustrates an electrophoretic display in accordance with the subject matter disclosed herein.

FIG. 1 illustrates a schematic model of a display pixel 100 of an electro-optic display in accordance with the subject matter presented herein. Pixel 100 may include an imaging film 110. In some embodiments, imaging film 110 may be a layer of electrophoretic material and bistable in nature. This electrophoretic material may include a plurality of electrically charged color pigment particles (e.g., black, white, yellow or red) disposed in a fluid and capable of moving through the fluid under the influence of an electric field. In some embodiments, imaging film 110 may be an electrophoretic film having micro-cells with charged pigment particles. In some embodiments, imaging film 110 may include, without limitation, an encapsulated electrophoretic imaging film, which may include, for example, charged pigment particles. It should be appreciated that the driving method presented below can be adopted for either type of electrophoretic material (e.g., an encapsulated electrophoretic medium or a film with micro-cells).

In some embodiments, imaging film 110 may be disposed between a front electrode 102 and a rear or pixel electrode 104. Front electrode 102 may be formed between the imaging film and the front of the display. In some embodiments, front electrode 102 may be transparent and light-transmissive. In some embodiments, front electrode 102 may be formed of any suitable transparent material, including, without limitation, indium tin oxide ("ITO"). Rear electrode 104 may be formed on an opposed side of the imaging film 110 to the front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET or a Thin-Film Transistor ("TFT"). The drain (or source) of the MOSFET or TFT may be coupled to back-plate or pixel electrode 104, the source (or drain) of the MOSFET or TFT may be coupled to the addressing electrode 108, and the gate of the MOSFET or TFT may be coupled to a driver electrode 106 configured to control the activation and deactivation of the MOSFET or TFT. (For simplicity, the terminal of the MOSFET or TFT coupled to back-plate electrode 104 will be referred to as the MOSFET or TFT's drain, and the terminal of the MOSFET or TFT coupled to addressing electrode 108 will be referred to as the MOSFET or TFT's source. However, one of ordinary skill in the art will recognize that, in some embodiments, the source and drain of the MOSFET or TFT may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

FIG. 2 illustrates a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Figure 3:
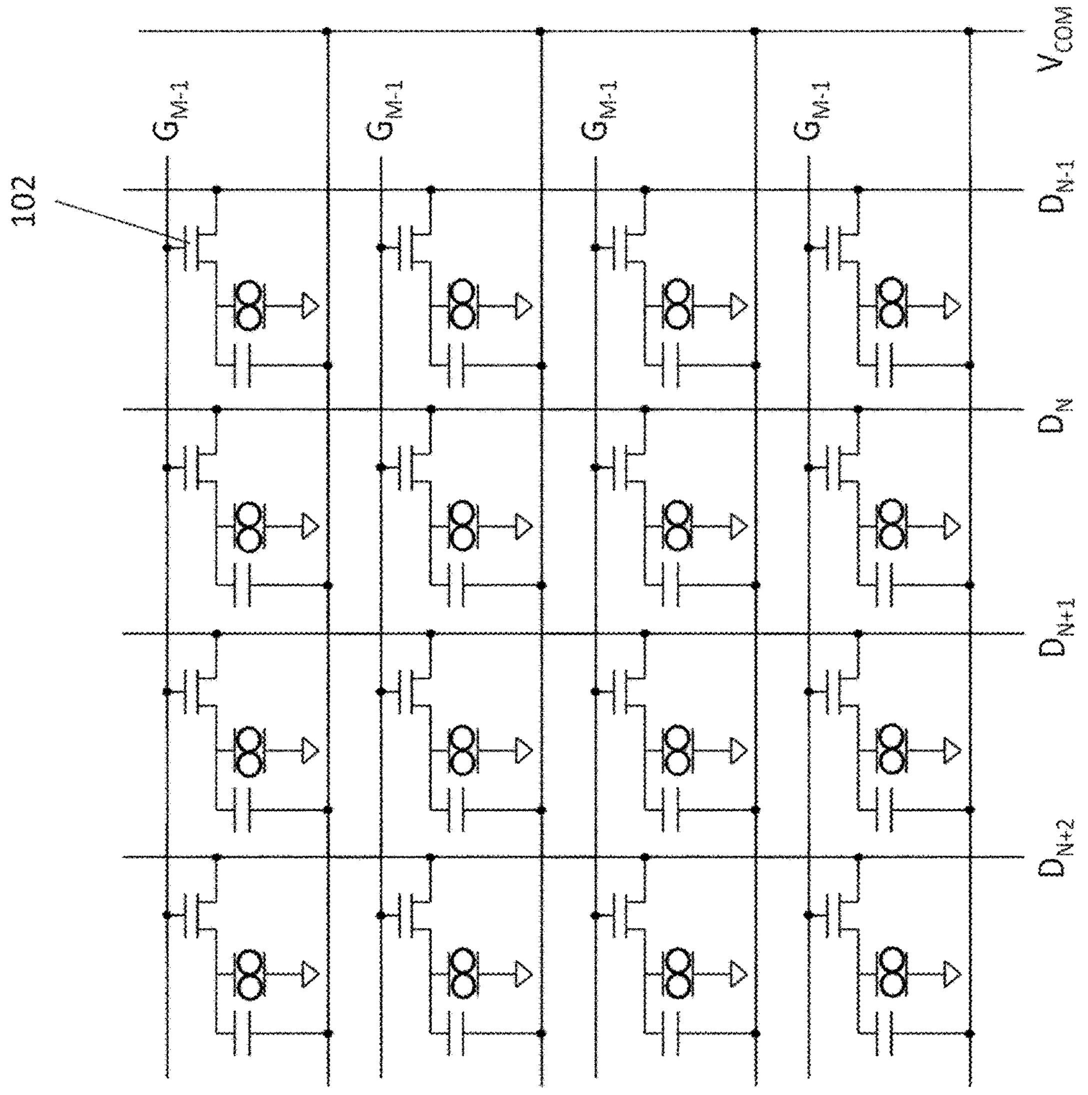
FIG. 3 illustrates an active matrix circuit in accordance with the subject matter disclosed herein.

FIG. 3 illustrates an exemplary active matrix for driving an electrophoretic display. In some embodiments, each display pixel of the electrophoretic display may be controlled by a thin-film-transistor (TFT). This TFT may be turned on and off to receive driving voltages to modulate optical states of the associated display pixel. To effectively control the driving of the associated display pixel, each TFT 102 may be provided with a gate line signal, a data line signal, $V_{com}$ line signal and a storage capacitor. In one embodiment, as illustrated in FIG. 1, the gate of each TFT 102 may be electrically coupled to a scan line, and the source or drain of the transistor may be connected to a data line, and the two terminals of the storage capacitor may be connected to a $V_{com}$ line and pixel the pixel electrode, respectively. In some embodiments, the $V_{com}$ on the bottom portion of the top substrate and the $V_{com}$ line grid on the top portion of the bottom substrate may be connected to the same DC source.

Figure 4:
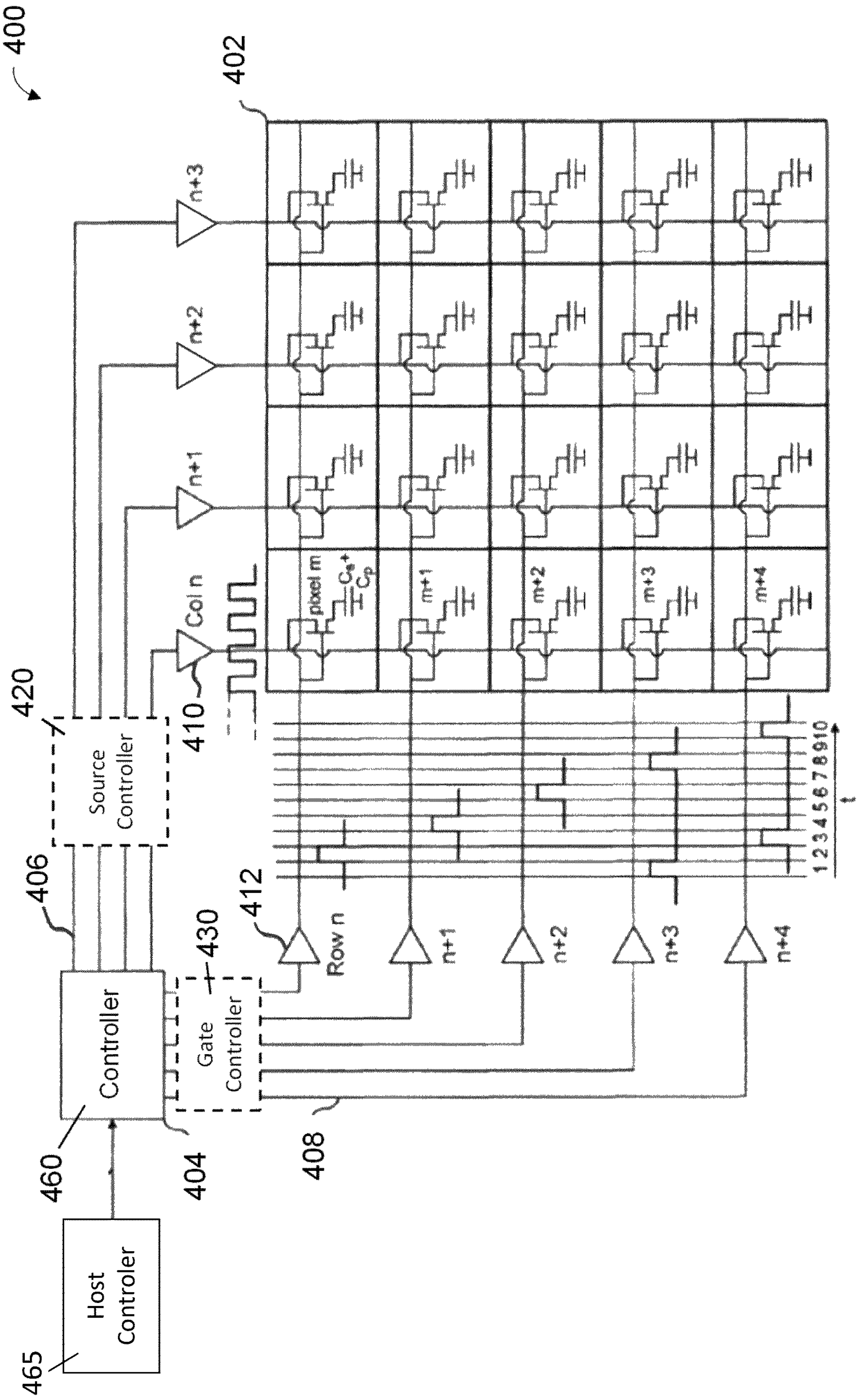
FIG. 4 is a diagrammatic view of an exemplary driving system for controlling voltages provided to pixel electrodes in an active matrix device. The resulting driving voltages can be used to set an optical state of a multi-particle electrophoretic medium.

Additional details of the row-column addressing used in an "active matrix" display are shown in FIG. 4. An addressing or pixel electrode, which addresses one pixel, is fabricated on a substrate 402 and connected to the appropriate voltage sources 404 and 406 through the associated non-linear element. It is understood that the voltage sources 404 and 406 may originate from separate circuit elements or the voltages can be delivered with the assistance of a single power supply and a power management integrated circuit (PMIC). In some instances, an intervening source controller 420 is used to control the supplied voltage, however in other embodiments the controller 460 is configured to control the entire addressing process, including coordinating the gate and source lines. In some embodiments, a host controller in communication with the controller 460 requests an update to the electrophoretic display and supplies the image data for the update to the controller 460.

It is also to be understood that FIG. 4 is an illustration of the layout of an active matrix backplane 400 but that, in reality, the active matrix has depth and some elements, e.g., the TFT, may actually be underneath the pixel electrode, with a via providing an electrical connection from the drain to the pixel electrode above.

Conventionally, in high resolution arrays, the pixels are arranged in a two-dimensional array of rows and columns, such that any specific pixel is uniquely defined by the intersection of one specified row and one specified column. The sources of all the transistors in each column are connected to a single column (scan) line 406, while the gates of all the transistors in each row are connected to a single row (gate) line 408; again the assignment of sources to rows and gates to columns is conventional but essentially arbitrary, and could be reversed if desired. The gate lines 408 are optionally connected to a gate line driver 412, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column scan lines 406 are optionally connected to scan line drivers 410, which place upon the various scan lines 406 voltages selected to drive the pixels in the selected row to their desired optical states. (The aforementioned voltages are relative to a common top electrode (e.g., $V_{com}$) which and is not shown in FIG. 4.)

With conventional driving, after a pre-selected interval known as the "line address time" the selected row is deselected, the next row is selected, and the voltages on the column drivers are changed so that the next line of the display is written. This process is repeated in a linear fashion so that the entire display is written in a row-by-row manner. As shown in FIG. 4, the temporal spacing between gate voltage pulses of respective frames is typically constant, and represent the rhythm of line by line addressing. Notably, the invention does not implement an even spacing between respective gate voltage pulses for a given address row of pixel electrodes.

Figure 5:
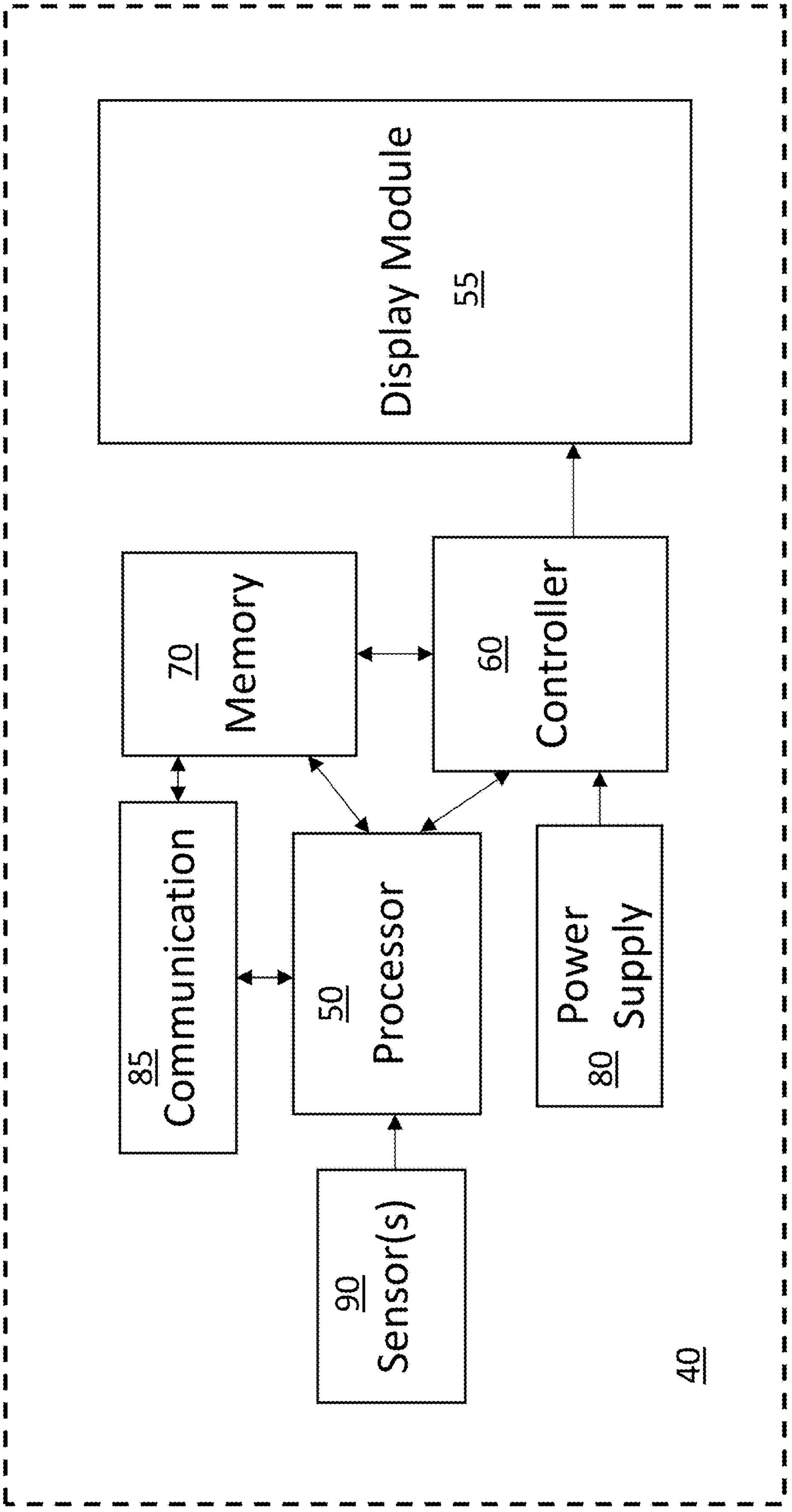
FIG. 5 a diagrammatic view of an exemplary electrophoretic display module.

The active matrix backplane described with respect to FIG. 4 is coupled to an electro-optic medium, and is typically sealed to create a display module 55, as shown in FIG. 5. Such a display module 55 becomes the focus of an electrophoretic display 40. The electrophoretic display 40 will typically include a processor 50 that is configured to coordinate the many functions relating to displaying content on the display module 55, and to transform "standard" images, such as sRGB images to a color regime that best duplicates the image on the display module 55. Of course, if the electrophoretic display is being used as a sensor or counter, the content may relate to other inputs.

The processor 50 is typically a mobile processor chip, such as made by Freescale or Qualcomm, although other manufacturers are known. The processor 50 is in frequent communication with the non-transitory memory 70, from which it pulls image files and/or lookup tables to perform, for example. color and grayscale image transformations or to retrieve driving waveform information as noted below. The non-transitory memory 70 may also include gate driving instructions to the extent that a particular optical transition may require a different gate driving pattern. The electrophoretic display 40 may have more than one non-transitory memory chip. The non-transitory memory 70 may be flash memory. In many embodiments, the non-transitory memory 70 is incorporated directly into the end consumer device by incorporating all of the elements of FIG. 5 into a circuit board or package. However, in some instances, the driving circuitry is not directly incorporated into the display, such as when the display becomes the exterior of an object such as an automobile.

Waveforms (discussed below) are typically stored in the non-transitory memory 70, however they can also be incorporated into the controller 60 or the processor 50 or they can be stored on the cloud and downloaded via communications 85. A number of lookup tables can be used to facilitate the methods of the invention, especially to provide time shifted waveforms to the controller 60 as appropriate. In particular for a given transition from a first color to a second color in an electrophoretic medium having eight primaries a lookup table could include instructions for updating from color 1 to a later color (with no time offset) in lookup slots 1 to 8, while instructions for updating from color 1 to a later color (with a first time offset) in lookup slots 9 to 16, and instructions for updating from color 1 to a later color (with a second time offset) in lookup slots 17 to 24, and so on. Of course, this type of lookup table can also be indexed for improved performance in view of operating conditions, such as device temperature, battery health, front-light color, front-light intensity, etc.

Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The electrophoretic display 40 may additionally include communication 85, which may be, for example, WIFI protocols or BLUETOOTH, and allows the electrophoretic display 40 to receive images and instructions, which also may be stored in memory 70. In some embodiments, a host controller (e.g., host controller 465 in FIG. 4) in communication with the display controller 60 requests an update to the electrophoretic display and supplies the image data for the update to the display controller 60. In some embodiments, the display controller 60 accepts the image data through access to a memory buffer that contains the image data, or receives a signal from which the image data is extracted. In some embodiments, the memory buffer has a structure such as those described in U.S. Pat. No. 9,721,495. In some embodiments, the display controller 60 receives serial signals containing the information required to perform the necessary calculations to generate drive impulses (e.g., driving waveforms) to apply to the electrophoretic medium during scans of the pixel array.

The electrophoretic display 40 may additionally include one or more sensors 90, which may include a temperature sensor and/or a photo sensor, and such information can be fed to the processor 50 to allow the processor 50 to select an optimum lookup table when such lookup tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

Figure 6:
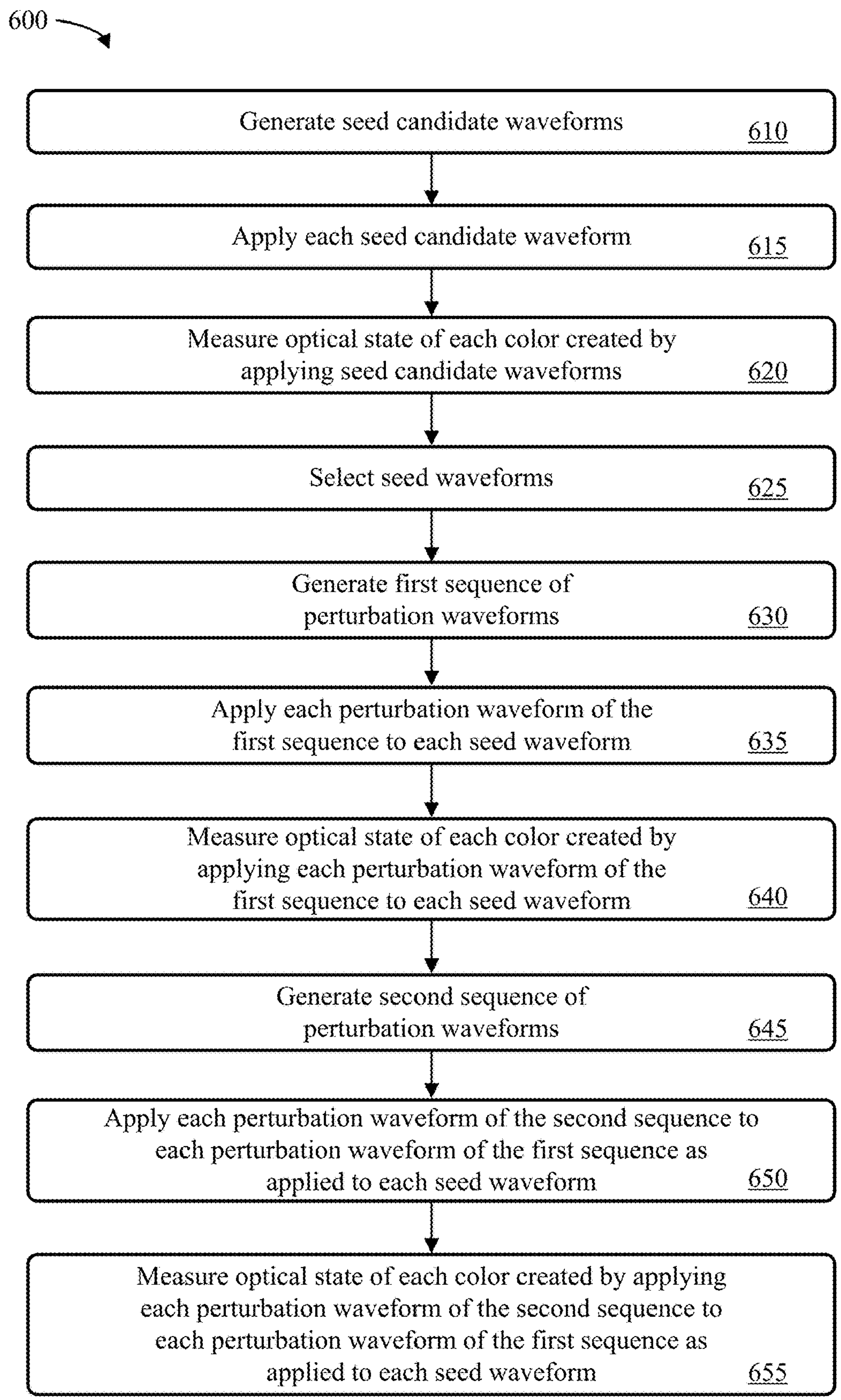
FIG. 6 shows an exemplary flow chart detailing the steps of a method for creating waveforms having a multi-transition structure for driving color electrophoretic displays.

FIG. 6 shows an exemplary flow chart 600 detailing the steps of a method for creating waveforms having a multi-transition structure for driving color electrophoretic displays. As illustrated in FIG. 6, the method initially generates seed candidate waveforms (610). For example, a set of seed candidate waveforms can be generated where each seed candidate waveform is unique and is capable of transitioning the optical state (e.g., color) of a display pixel of the electrophoretic display.

Figure 7:
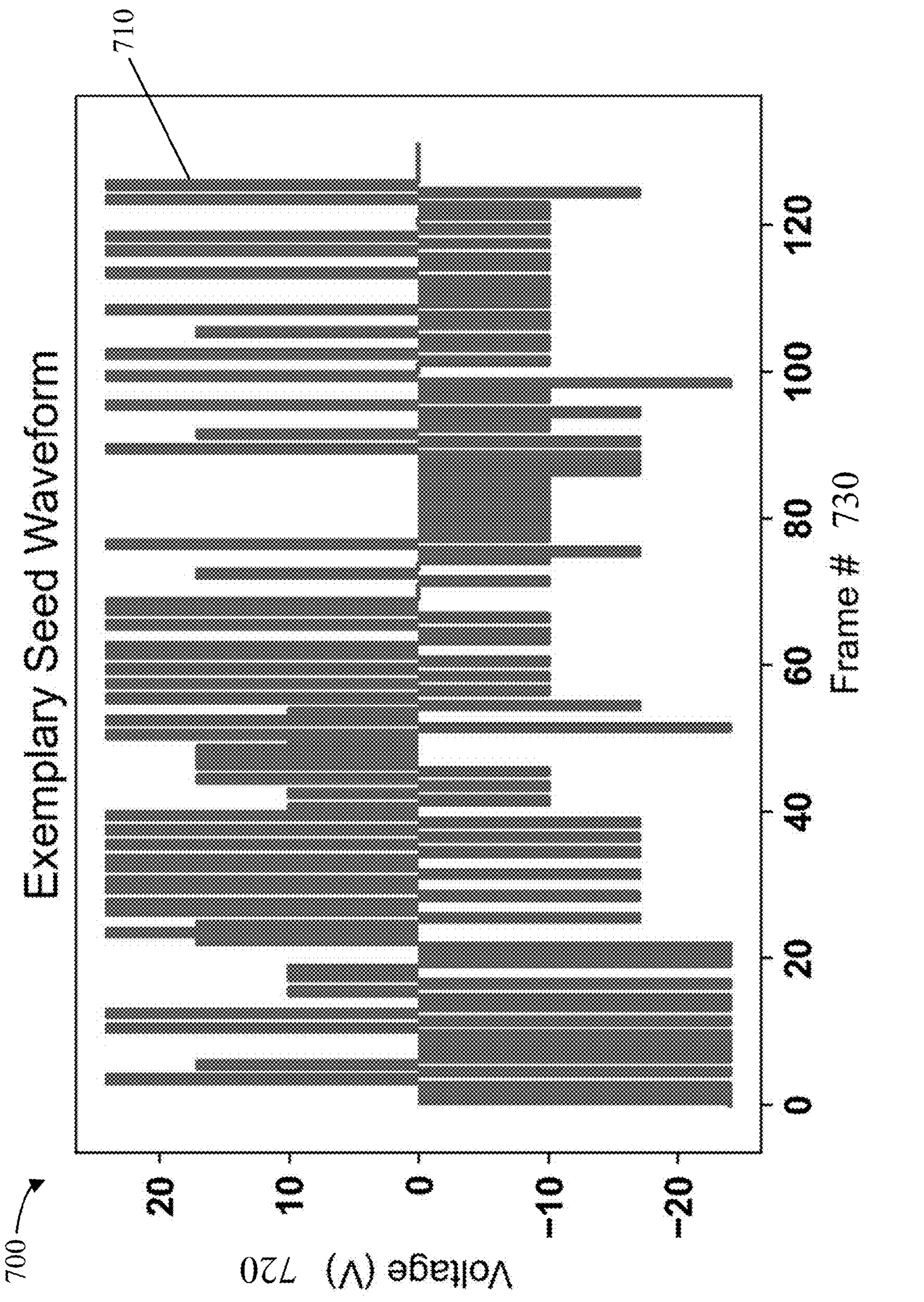
FIG. 7 is a waveform diagram showing an exemplary seed waveform plotted as voltage versus frame number.

FIG. 7 is a waveform diagram 700 showing an exemplary seed waveform 710 plotted as Voltage (V) 720 versus Frame Number 730. Seed waveform 710 includes a series of voltage impulses that are applied to a display pixel of an electrophoretic display over the course of approximately 127 frames to change or transition the optical state of the display pixel. In the example shown in FIG. 7, seed waveform 710 includes voltage impulses set to any one of seven voltage levels during each frame, ranging from approximately +24V to approximately −24V (e.g., +/−24V, +/−18V, +/−10V, and 0V). The seed waveform 710 shown in FIG. 7 is exemplary only. One of skill in the art will appreciate that seed waveforms having more or fewer than seven possible voltage levels can be generated for transitioning the optical state of a display pixel. Further, seed waveforms shorter or longer in duration than 127 frames can be generated.

Once a set of seed candidate waveforms is generated, each seed candidate waveform is applied (615). For example, each seed candidate waveform can be applied to the display pixels of a color electrophoretic display as described in detail above. Next, the optical state of each color created by applying the seed candidate waveforms is measured (620). For example, optical measurements of the colors created by applying the seed candidate waveforms can be performed using optical measurement techniques and equipment known in the art such as spectrophotometers and colorimeters. For background, see, e.g., D. Hertel, "Optical measurement standards for reflective e-paper to predict colors displayed in ambient illumination environments," *Color Research & Application,* 43, 6, (907-921), (2018), which is incorporated by reference herein.

Based on the optical measurements of the colors produced by applying each seed candidate waveform, a set of seed waveforms is selected (625). For example, a set of "N" seed waveforms can be selected from the set of seed candidate waveforms where each of the N seed waveforms is capable of transitioning the optical state of a display pixel to one of the palette colors of the electrophoretic display. The number of seed waveforms can therefore correspond to the number of pure, analog colors (e.g., palette colors) the electrophoretic display is capable of displaying, i.e., for an electrophoretic display capable of displaying N palette colors, a set of N seed waveforms can be chosen. In some embodiments, a set of seed waveforms is selected based on an optimization algorithm that chooses seed waveforms that will provide the best colors based on parameters of the electrophoretic display system and operating environment.

Many electrophoretic display controllers incorporate a lookup table or transition matrix (also referred to as a "state image") having one dimension for the desired final optical state, and one dimension for the current optical state. The elements of the matrix typically contain a function, V(t), representing the waveform that is to be applied to a display pixel to transition the pixel from its current optical state to the desired final optical state. In some embodiments, the elements of the lookup table or transition matrix each include multiple waveforms that are selected by the controller depending on the driving mode or scheme of the electrophoretic display (e.g., direct update or "DU," global complete or "GC," global limited or "GL," and other variants such as Regal, etc.).

It is common for the waveforms of a conventional transition matrix to be prior state dependent, meaning that the waveform used to drive a display pixel to a particular desired final optical state may be different depending on the current optical state of the display pixel. However, for the set of seed waveforms selected at step 625, each of the seed waveforms is prior state independent. This means that for a particular desired final optical state, the same seed waveform can be used regardless of the current (or any prior) optical state of the display pixel to which the waveform is being applied. This is advantageous as it simplifies the display update process and significantly reduces the amount of system memory required to store the waveform values in the transition matrix.

A first sequence of perturbation waveforms is generated at step 630. Like seed waveforms, perturbation waveforms include a series of voltage impulses that are applied to a display pixel of an electrophoretic display over the course of multiple frames to change or transition the optical state of the display pixel. However, the duration or length of the perturbation waveforms is typically much shorter relative to that of the seed waveforms. For example, perturbation waveforms can have a duration of only one or two frames in some embodiments, although typically perturbation waveforms have a duration of three or more frames.

The number of perturbation waveforms in a sequence is directly related to the duration of each perturbation waveform in number of frames M and the number of voltage levels V the display controller is capable of applying. For example, for a first perturbation sequence $P_1$, if each perturbation waveform is chosen to have a duration of M=3 frames and there are V=7 voltage levels available, there are $V^M$ or in this example, $7^3$=343 possibilities for unique perturbation waveforms that can be generated.

Figure 8:
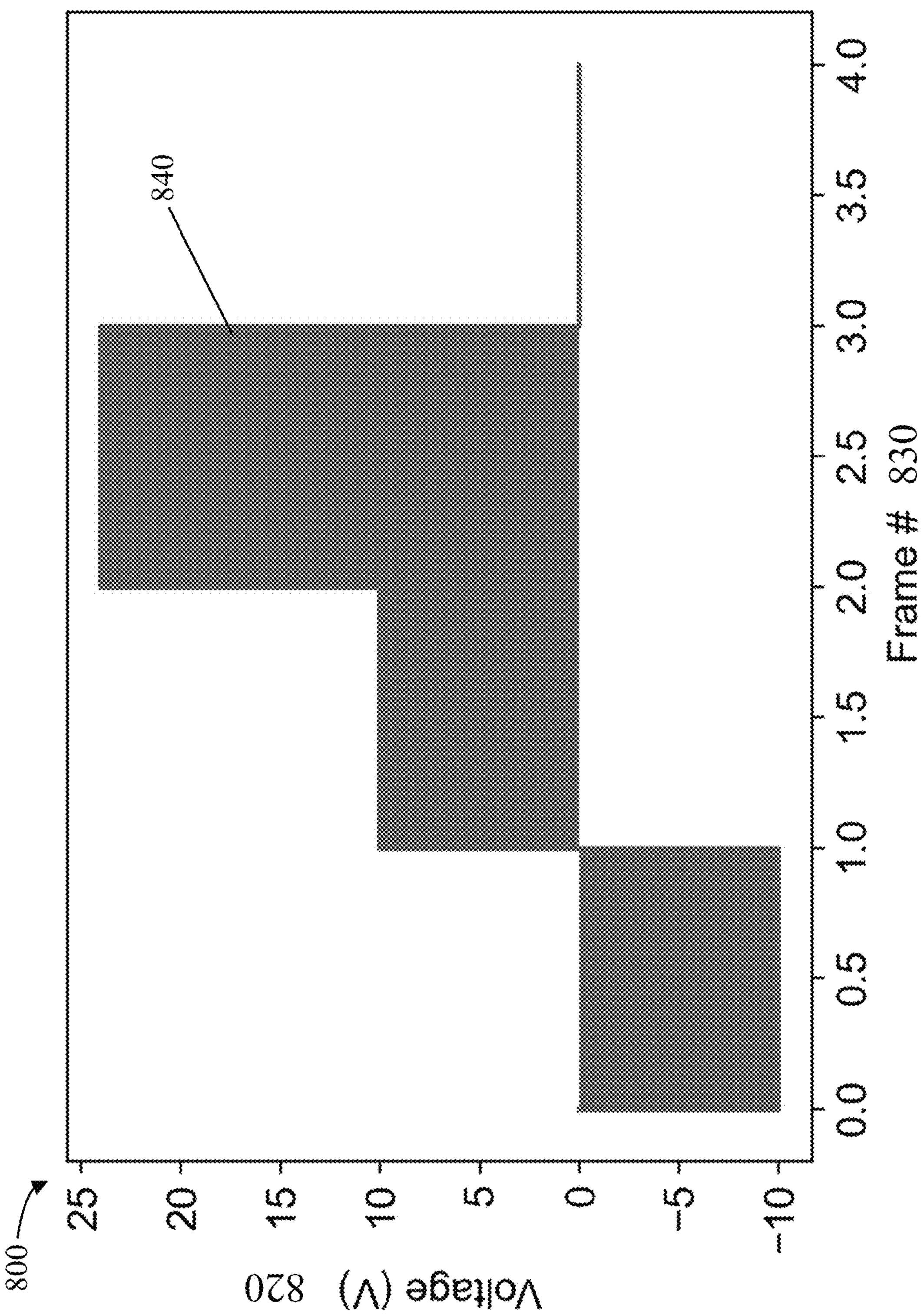
FIG. 8 is a waveform diagram showing an exemplary perturbation waveform plotted as voltage (V) versus frame number.

FIG. 8 is a waveform diagram 800 showing an exemplary perturbation waveform 840 plotted as Voltage (V) 820 versus Frame Number 830. Perturbation waveform 840 includes a series of voltage impulses that are applied to a display pixel of an electrophoretic display over the course of 3 frames to change or transition the optical state of the display pixel. Perturbation waveform 840 includes voltage impulses set to −10V for the first frame, +10V for the second frame, and +24V for the third frame. In the example shown in FIG. 800, perturbation waveform 840 illustrates 1 of the 343 possible permutations of unique perturbation waveforms that can be generated when M=3 frames and the display controller is capable of applying any one of 7 voltage levels (e.g., +/−24V, +/−18V, +/−10V, and 0V).

Each of the perturbation waveforms of the first sequence can be indexed in a lookup table or transition matrix (also referred to as a "state image") to be accessed by the display controller. In some embodiments, a subset of the total possible permutations of unique perturbation waveforms is used instead of an exhaustive list of all possible waveforms given the number of frames and voltage levels. This can be used as a way to conserve memory resources, or where it is determined that applying multiple perturbation waveforms results in the same, or substantially the same, color.

Once the first sequence of perturbation waveforms is generated, each perturbation waveform of the first sequence is applied to each seed waveform (635). For example, each perturbation waveform of the first sequence is applied after each seed waveform to create $N*V^M$ unique waveforms, or in this example, $8*7^3=2744$ unique waveforms, each of which can be used to present a different color on the electrophoretic display.

Next, the optical state of each color created by applying each perturbation waveform of the first sequence to each seed waveform is measured (640). For example, as above, optical measurements of the colors created after applying each of the 2744 resulting transitions or waveforms in the example above can be performed to determine the color that results from applying each of the perturbation waveforms to each seed waveform.

Figure 9:
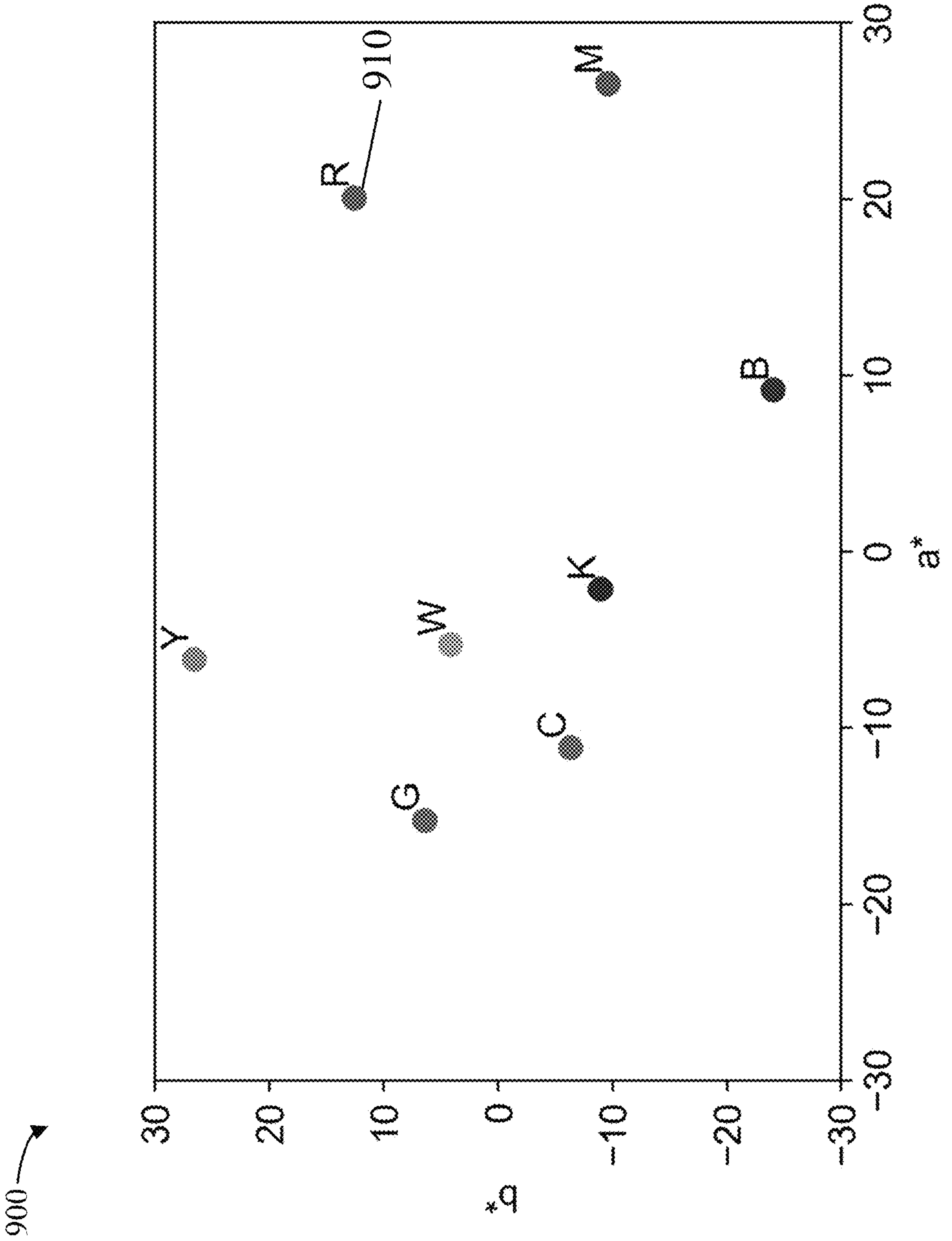
FIG. 9 is an exemplary plot in CIE L*,a*,b* color space showing the palette or primary colors that are presented on the color electrophoretic display upon application of each of the seed waveforms.

FIG. 9 is an exemplary plot 900 in CIE L*,a*,b* color space showing the palette or primary colors that are presented on the color electrophoretic display upon application of each of the N seed waveforms. For example, plot 910 is a plot of the resulting red palette or primary color that is presented on the color electrophoretic display when the corresponding seed waveform is applied. In this example, there are also plots of the black (K), white (W), green (G), blue (B), cyan (C), magenta (M), and yellow (Y) primary colors of the color electrophoretic display. Accordingly, for this set of N seed waveforms, the value of N is 8. However, one of skill in the art will appreciate that values other than N=8 can be chosen without departing from the scope of the subject matter described herein.

Figure 10:
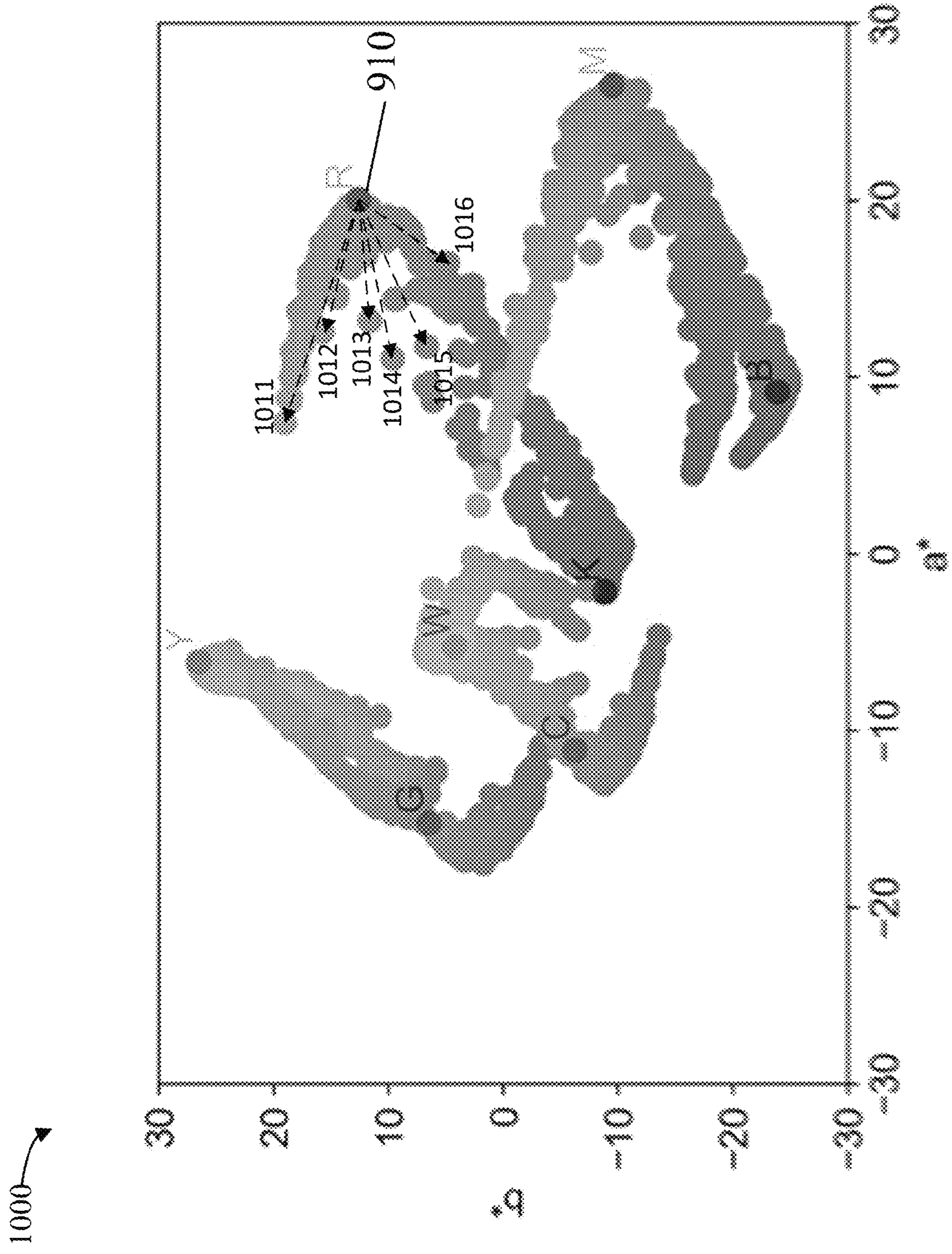
FIG. 10 is an exemplary plot in CIE L*, a*,b* color space showing the resulting colors that are presented on the color electrophoretic display upon application of each perturbation waveform of the first sequence to each seed waveform.

FIG. 10 is an exemplary plot 1000 in CIE L*,a*,b* color space showing the resulting colors that are presented on the color electrophoretic display upon application of each perturbation waveform of the first sequence to each seed waveform. For reference, the original plots of the 8 primary colors from FIG. 9 are included. These plots of the 8 primaries are the starting point when each of the perturbation waveforms of the first sequence is applied. Application of each perturbation waveform shifts the color from its initial optical state. For example, color plots 1011-1016 show the resulting color that is presented after separate application of 6 of the 343 different perturbation waveforms to seed waveform that initially presented the red primary shown as plot 910 in FIG. 10.

A second sequence of perturbation waveforms is generated at step 645. The perturbation waveforms of the second sequence can be similar or identical to the perturbation waveforms of the first sequence, but they need not be. Like the perturbation waveforms of the first sequence, the duration or length of the perturbation waveforms of the second sequence is typically much shorter relative to that of the seed waveforms.

The number of perturbation waveforms in the second sequence is determined the same way as above. For a second perturbation sequence $P_2$, if each perturbation waveform is chosen to have a duration of M=3 frames and there are V=7 voltage levels available, there are $V^M$ or in this example, $7^3=343$ possibilities for unique perturbation waveforms that can be generated in the second sequence. (Note that in this example where M=3 and V=7 for both sequences, there is a one for one correspondence between the perturbation waveforms in the first and second sequences.)

Each of the perturbation waveforms of the second sequence can be indexed in a lookup table or transition matrix (also referred to as a "state image") to be accessed by the display controller. In some embodiments, if the first and second sequences of perturbation waveforms are identical, a single lookup table or transition matrix is used to advantageously reduce memory and resource consumption.

Once the second sequence of perturbation waveforms is generated, each perturbation waveform of the second sequence is applied to each perturbation waveform of the first sequence as applied to each seed waveform (650). For example, each perturbation waveform of the second sequence is applied after each perturbation waveform of the first sequence is applied as described above. Continuing the example, this creates $N*(V^M)^P$ unique waveforms where P is the total number of sequences generated. For this example, this creates $8*(7^3)^2=941{,}192$ possible unique waveforms, each of which can be used to present a different color on the electrophoretic display.

Next, the optical state of each color created by applying each perturbation waveform of the second sequence to each perturbation waveform of the first sequence as applied to each seed waveform is measured (655). For example, as above, optical measurements of the colors created after applying each of the 941, 192 resulting transitions or waveforms in the example above can be performed to determine the color that results after applying each of the perturbation waveforms of the second sequence as described above.

Figure 11:
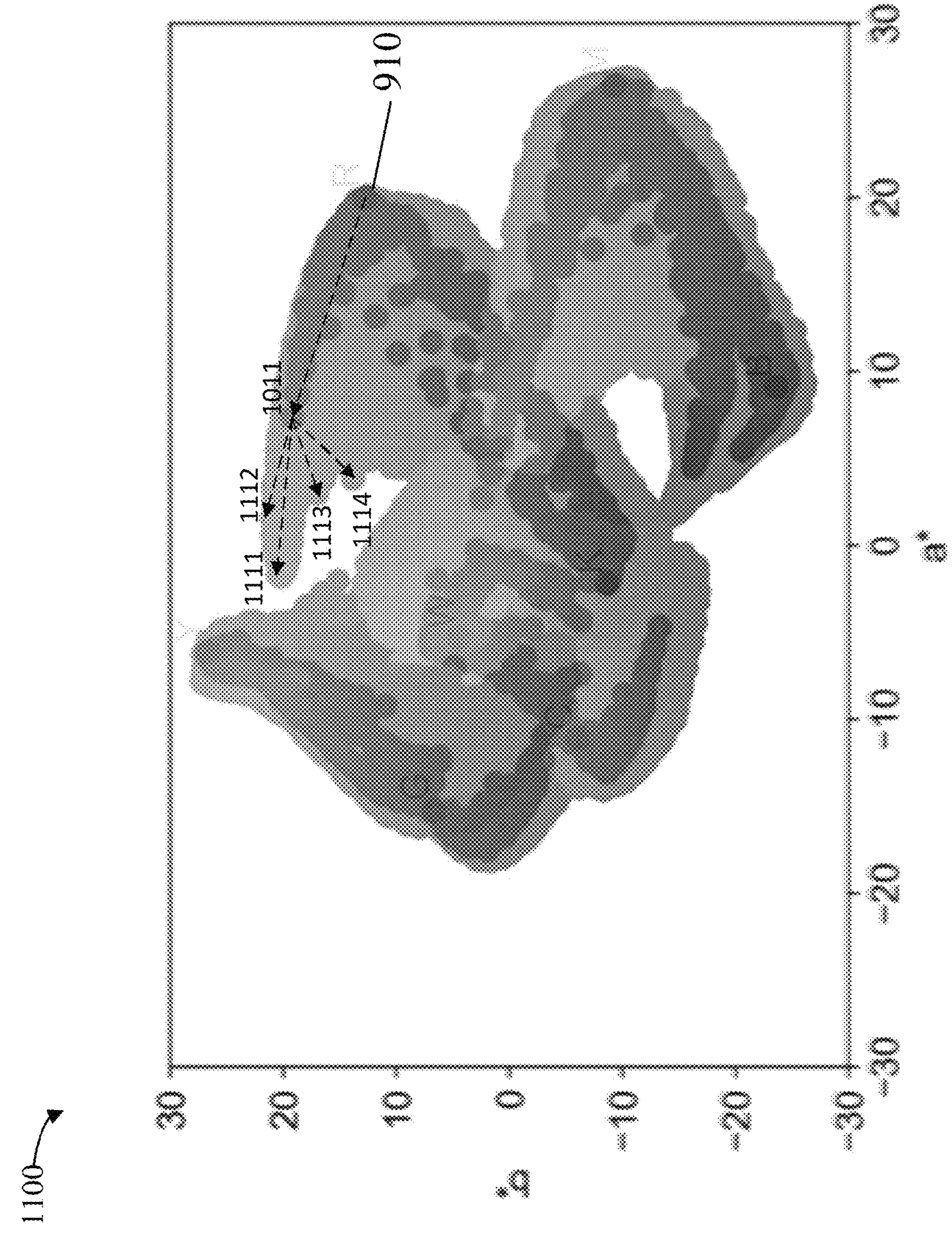
FIG. 11 is an exemplary plot in CIE L*,a*,b* color space showing the resulting colors that are presented on the color electrophoretic display upon application of each perturbation waveform of the second sequence to each perturbation waveform of the first sequence as applied to each seed waveform.

FIG. 11 is an exemplary plot 1100 in CIE L*,a*,b* color space showing the resulting colors that are presented on the color electrophoretic display upon application of each perturbation waveform of the second sequence to each perturbation waveform of the first sequence as applied to each seed waveform. For reference, the original plots of the 8 primary colors from FIG. 9 are included as well as the plots after the first sequence of perturbation waveforms were applied to each seed waveform. Color plot 1011 from FIG. 10 is labelled to illustrate an exemplary starting point when each of the perturbation waveforms of the second sequence is applied. Application of each perturbation waveform of the second sequence shifts the color from its previously-shifted optical state. For example, color plots 1111-1114 show the resulting color that is presented after separate application of 4 of the 343 different perturbation waveforms from the second sequence to the color shown by color plot 1011.

Accordingly, using the method described above enables the generation of a substantial number of unique color states using a minimal amount of system resources. For example, the lookup table or state image for the seed waveforms can be indexed from 1−N, then P additional images lookup tables or state images can be indexed from $1-V^M$. Using the example described herein, uniquely indexing ~1M possible unique colors can be done with a total of three lookup tables or state images when the number of perturbation sequences P=2, and the size of the lookup tables for the perturbation waveform sequences are generally small. In general, the number of lookup tables or state images required is only P+1. Accordingly, the method described herein can be executed on a commercial controller using without significantly increasing resource utilization or run time.

Figure 12:
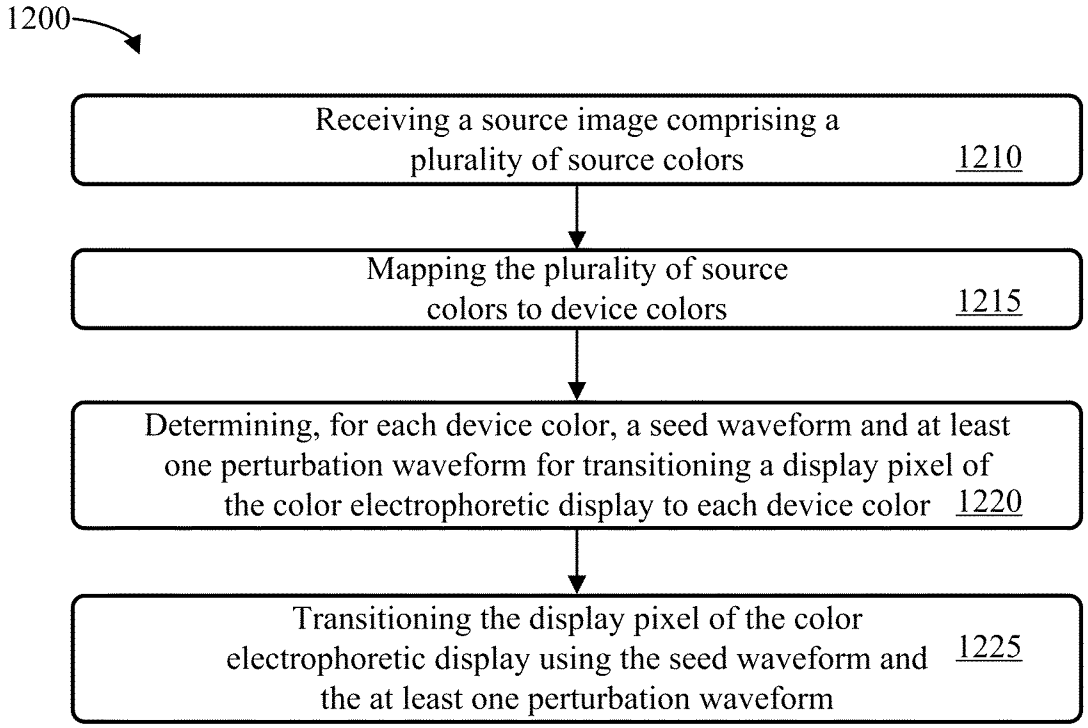
FIG. 12 shows an exemplary flow chart detailing the steps of a method for driving a color electrophoretic display to present images without using dithering.

FIG. 12 shows an exemplary flow chart 1200 detailing the steps of a method for driving a color electrophoretic display to present images without using dithering. As illustrated in FIG. 12, the method begins with receiving a source image comprising a plurality of source colors (1210). For example, the display controller (e.g., 60, 460) can receive a source image from a host controller (e.g., 465). The source image can be formatted such that the source colors are encoded in RGB format.

Next, the method includes mapping the plurality of source colors to device colors (1215). For example, the color mapping process takes each color in the source space and maps it to a color within the gamut volume of the electrophoretic display device space, which is more limited. The volume of the gamut in the device space can be approximated by using the convex hull of the seed waveforms. In one embodiment, an example image and standard lookup table are used to generate colors within the device space for each of the pixels of the image. This generates a "mapped" image, which provides a color value for each pixel within the device space.

The method includes determining, for each device color, a seed waveform and at least one perturbation waveform for transitioning a display pixel of the color electrophoretic display to each device color (1220). In general, the N seeds can be chosen in method 600 described above such that the P perturbation sequences lead to color states that "fill in" the entire color space. Various algorithms can be used to index the ~1M unique color values given a color mapped image. In some embodiments, the KDTree algorithm can be used as a naïve LSQ minimization method.

Once the seed waveform and at least one perturbation waveform are determined, the method includes transitioning the display pixel of the color electrophoretic display using the seed waveform and the at least one perturbation waveform (1225). For example, the appropriate seed waveform from the seed waveform lookup table or state image is applied, then the appropriate at least one perturbation waveform from the at least one perturbation waveform lookup or state image is applied to drive a display pixel to a true color without requiring dithering.

Figure 13B:
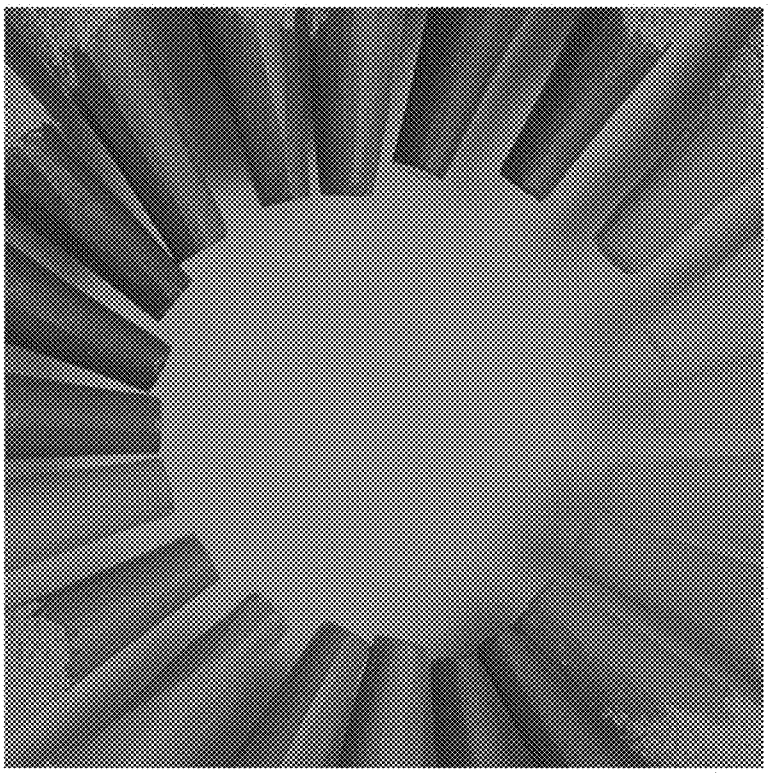
FIG. 13B shows a color-mapped image which provides a color value for each pixel within the device space.
Figure 13A:
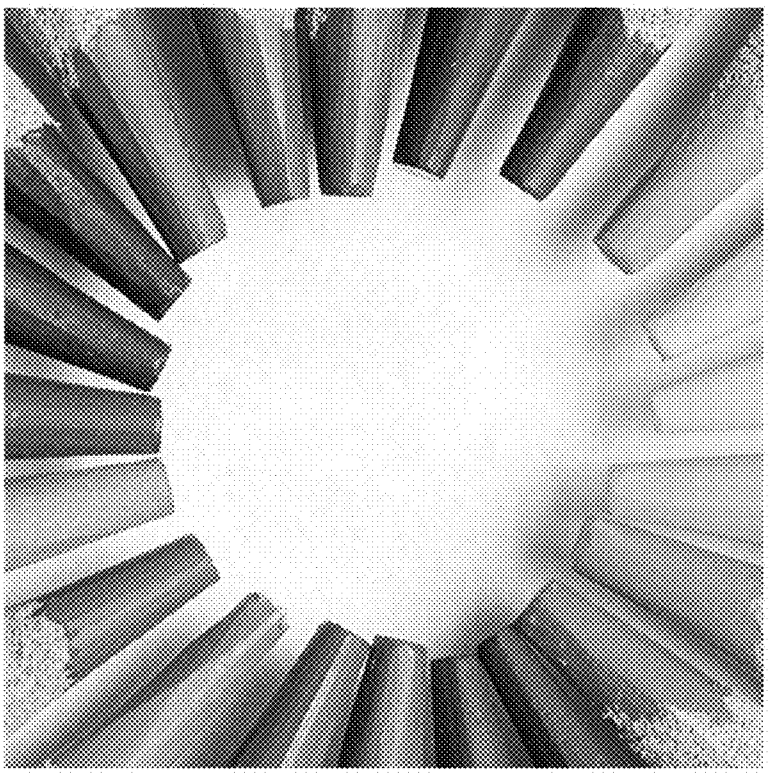
FIG. 13A shows a source image.

FIGS. 13A-13D show the results of a comparison between an image presented using a dithering-based method (using just the N seed waveforms) and an image presented according to the method 600 described herein where the nearest color formed by all of the perturbations (in this case almost 1M unique color values) is found for each color to be displayed. FIG. 13A shows a source image 1300*a*, and FIG. 13B shows color-mapped image 1300*b* which provides a color value for each pixel within the device space.

Figure 13D:
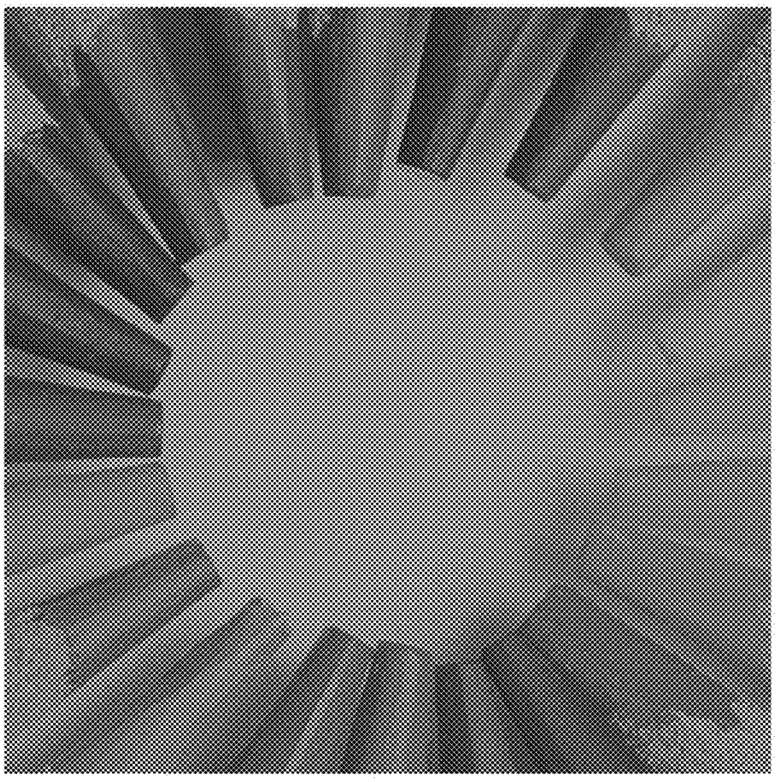
FIG. 13D shows an image prepared and presented without dithering, according to the subject matter disclosed herein.
Figure 13C:
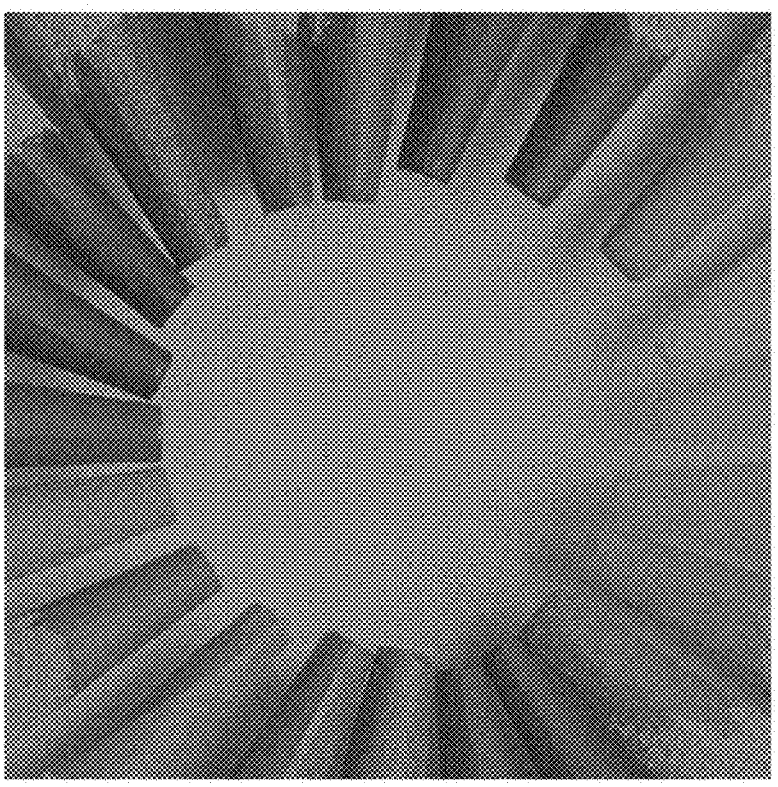
FIG. 13C shows a dithered image.

FIG. 13C shows a dithered image 1300*c*, and FIG. 13D shows an image 1300*d* prepared and presented without dithering. As evidenced by FIGS. 13C and 13D, the dithered image 1300*c* demonstrates significant artifacts due to the spatial multiplexing of pixels to generate the intended color. The "no dithering" image 1300*d* that has been made using the method described herein shows smooth gradients in most cases and clean solid colors. This improves image appearance significantly. For low-PPI displays or displays with high PPI and short viewing distance, dither patterns are obvious and distracting, and contribute to a less "natural" feel. This invention solves those problems while remaining practically viable and immediately realizable as a solution for signage and other applications for color electrophoretic displays. For example, without using dithering techniques, the methods described herein can boost the resolution of low-PPI displays.

This invention also improves the transition appearance of each of the ~1M unique colors. For example, a majority of the transition time is governed by the N seed waveforms, which can be optimized for good transition appearance (e.g., minimal flashiness, minimal ghosting). In the example discussed herein, only 6 frames (P*M) are different for the ~1M unique waveforms, while the other 127 frames are split into just N distinct possibilities. This gives a pleasant transition appearance and controls artifacts like ghosting and blooming and because the set of seed waveforms can be small, the seed waveforms can be optimized to reduce such artifacts.

Finally, this invention provides a method to substantially increase the total number of colors per pixel without incurring a proportional reduction in system resources or update times. For example, as stated above, a majority of the transition time for each pixel update is attributable to the 127-frame seed waveforms. Appending each seed waveform with two 3-frame perturbation waveforms as in the described example above increases the number of possible colors that can be presented exponentially while only incurring a 50 ms time penalty per perturbation waveform.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The contents of all of the aforementioned patents and applications are incorporated by reference herein in their entireties.

The invention claimed is:

1. A method for creating waveforms having a multi-transition structure for driving a color electrophoretic display, the method comprising:
- generating a set of seed candidate waveforms;
- applying each of the set of seed candidate waveforms to display pixels of the color electrophoretic display;
- measuring an optical state of each color created at the display pixels by applying the set of seed candidate waveforms;
- selecting a set of seed waveforms based on optical measurements of the colors produced by applying each of the set of seed candidate waveforms;
- generating a first sequence of perturbation waveforms;
- appending each of the first sequence of perturbation waveforms to each of the set of seed waveforms to create a first set of unique waveforms;
- applying each of the first set of unique waveforms to display pixels of the color electrophoretic display; and
- measuring an optical state of each color created at the display pixels by applying each of the first set of unique waveforms to determine unique colors that can be presented on the color electrophoretic display by applying each of the first set of unique waveforms.

2. The method of claim 1 further comprising:
- generating a second sequence of perturbation waveforms;
- appending each of the second sequence of perturbation waveforms to each of the first set of unique waveforms to create a second set of unique waveforms;
- applying each of the second set of unique waveforms to display pixels of the color electrophoretic display; and
- measuring an optical state of each color created by applying each of the second set of unique waveformcs to determine unique colors that can be presented on the color electrophoretic display by applying each of the second set of unique waveforms.

3. The method of claim 2 wherein a number of perturbation waveforms in the second sequence of perturbation waveforms corresponds to a number of voltage levels a display controller is capable of providing to each display pixel and a duration of each perturbation waveform.

4. The method of claim 3 wherein the number of perturbation waveforms in the second sequence of perturbation waveforms is equal to $V^M$, where V is the number of voltage levels the display controller is capable of providing to each display pixel and Mis the duration of each perturbation waveform in number of frames.

5. The method of claim 2 wherein a duration of each perturbation waveform in the first sequence of perturbation waveforms is equal to a duration of each perturbation waveform in the second sequence of perturbation waveforms.

6. The method of claim 5 wherein a total possible number of unique waveforms in the second set of unique waveforms is equal to $N^*(V^M)^P$, where N is the number of seed waveforms, V is a number of voltage levels the display controller is capable of providing, M is the duration of each perturbation waveform in the first and second sequences of perturbation waveforms in number of frames, and P is a number of sequences of perturbation waveforms generated.

7. The method of claim 2 wherein the set of seed waveforms, the first sequence of perturbation waveforms, and the second sequence of perturbation waveforms are indexed in a lookup table.

8. The method of claim 7 wherein the set of seed waveforms is indexed from 1-N, where N is the number of seed waveforms in the set of seed waveforms.

9. The method of claim 7 wherein the first sequence of perturbation waveforms is indexed from 1-$V^M$, where Vis a number of voltage levels the display controller is capable of providing and M is a duration of each perturbation waveform the first sequence of perturbation waveforms in number of frames.

10. The method of claim 7 wherein the second sequence of perturbation waveforms is indexed from 1-$V^M$, where Vis a number of voltage levels the display controller is capable of providing and M is a duration of each perturbation waveform the second sequence of perturbation waveforms in number of frames.

11. The method of claim 1 wherein the set of seed waveforms comprises eight unique waveforms.

12. The method of claim 11 wherein each of the eight unique waveforms corresponds to a primary color the color electrophoretic display is capable of presenting.

13. The method of claim 1 wherein a number of perturbation waveforms in the first sequence of perturbation waveforms corresponds to a number of voltage levels a display controller is capable of providing to each display pixel.

14. The method of claim 1 wherein a number of perturbation waveforms in the first sequence of perturbation waveforms corresponds to a number of voltage levels a display controller is capable of providing and a duration of each perturbation waveform.

15. The method of claim 14 wherein the number of perturbation waveforms in the first sequence of perturbation waveforms is equal to $V^M$, where Vis the number of voltage levels the display controller is capable of providing and M is the duration of each perturbation waveform in number of frames.

16. The method of claim 15 wherein a total possible number of unique waveforms in the first set of unique waveforms is equal to $N^*V^M$, where N is the number of seed waveforms.

* * * * *